(12) United States Patent
Ezzeddini et al.

(10) Patent No.: US 6,220,023 B1
(45) Date of Patent: Apr. 24, 2001

(54) LINE ELEMENT WITH DAMPING, PARTICULARLY FOR EXHAUST PIPES OF INTERNAL COMBUSTION ENGINES IN MOTOR VEHICLES

(75) Inventors: Fethi Ezzeddini, Karlsruhe; Georg Salzer, Waghäusel, both of (DE)

(73) Assignee: IWK Regler und Kompensatoren GmbH, Stutensee (DE)

( * ) Notice: Subject to any disclaimer, the term of this patent is extended or adjusted under 35 U.S.C. 154(b) by 0 days.

(21) Appl. No.: 09/321,724

(22) Filed: May 28, 1999

(30) Foreign Application Priority Data

May 29, 1998 (DE) .............................. 198 24 091

(51) Int. Cl.[7] ...................................... F01N 7/00
(52) U.S. Cl. ................. 60/322; 60/272; 60/282; 138/118; 138/121
(58) Field of Search ............... 60/272, 282, 322, 60/323; 138/118, 121

(56) References Cited

U.S. PATENT DOCUMENTS

| | | | |
|---|---|---|---|
| 4,315,558 | * | 2/1982 | Katayama ........................... 181/227 |
| 4,854,416 | * | 8/1989 | Lalikos et al. ...................... 181/207 |
| 4,867,269 | * | 9/1989 | Lalikos et al. ...................... 181/207 |
| 5,134,846 | * | 8/1992 | White ..................................... 60/272 |
| 5,901,754 | * | 5/1999 | Elsässer ................................ 138/118 |
| 6,062,266 | * | 5/2000 | Burkhardt ............................ 138/114 |
| 6,062,268 | * | 5/2000 | Elsässer et al. ...................... 138/121 |

FOREIGN PATENT DOCUMENTS

0327148 * 8/1989 (EP) ...................................... 60/272

* cited by examiner

*Primary Examiner*—Thomas Denion
*Assistant Examiner*—Binh Tran
(74) *Attorney, Agent, or Firm*—Antonelli, Terry, Stout & Kraus, LLP

(57) ABSTRACT

A flexible line element, particularly for exhaust pipes of internal combustion engines of motor vehicles, is disclosed having a screw thread-like or annularly corrugated bellows provided with cylindrical connection ends and a metal netting directly surrounding the bellows. The metal netting is inherently stable and has at least one plastic deformation for acoustic or mechanical damping of the bellows. Consequently, the metal netting has both a protective and a damping function.

35 Claims, 2 Drawing Sheets

LINE ELEMENT WITH DAMPING, PARTICULARLY FOR EXHAUST PIPES OF INTERNAL COMBUSTION ENGINES IN MOTOR VEHICLES

BACKGROUND OF THE INVENTION

1. Field of the Invention

The invention relates to a flexible line element, particularly for exhaust pipes of internal combustion engines for motor vehicles, with a screw thread-like or annularly corrugated bellows provided with cylindrical connection ends, and a metal netting or braid arranged coaxially to and in contact with the bellows.

2. Description of the Prior Art

Such line elements are introduced in the form of adaptors into the exhaust pipe, which is normally installed in fixed manner on the vehicle floor, optionally accompanied by the interposing of flexible support parts, in order to absorb movements and vibrations and prevent the transfer thereof to adjacent components, such as occur through the elastically mounted engine, vehicle faults, temperature-caused length changes, etc. If there is a lack of bellows damping, in the resonant range of the free bellows increased movements occur thereto, leading to a reduction in the service life and interact with other components for producing noise.

EP 681 096 A1 describes a flexible line element, in which the bellows is surrounded by a knitted fabric tube fixed at both bellows ends. The knitted fabric tube supports the bellows axially in both directions, because the meshes can be moved in both the tension and pressure directions and there are limits to the movement thereof in both directions. However, it is disadvantageous that the line element is relatively unprotected to the outside, because it is possible for impurities or particles, e.g. gravel or loose stones, to be fixed in the mesh gaps, so that the mobility of the knitted fabric is impaired in such a way that the axial mobility of the line element overall is reduced and consequently so is its decoupling action. Moreover, the knitted fabric is not only flat, but also has a finite, compressible height, so that the knitted fabric can also be compressed, accompanied by a lose of its action.

German utility model 296 09 293.2 discloses a flexible line element with a knitted fabric tube directly surrounding the bellows and which additionally has a braided tube completely externally surrounding the knitted fabric hose and positioned coaxially to the line element. The braided tube is fixed to the connection ends of the line element, so that the knitted fabric hose surrounding the bellows is protected against pollution and dirt applied from the outside. This construction is relatively expensive, because the line element is formed from three different types of tubes and the damping function and protective function are fulfilled by different components.

SUMMARY OF THE INVENTION

According to the invention, the problem of the prior art is solved by a line element of the aforementioned type, in that the metal netting has plastic deformations for the acoustic and/or mechanical damping of the bellows.

Therefore, the problem solved by the invention, based on a line element of the aforementioned type, is to equip it in such a way that on the one hand the decoupling action is still maintained for loose stones and dirt applied from the outside to the line element and, on the other hand, the damping function and protective function are fulfilled by a single line element component.

The damping principle of the constructed line element of the invention is based on the plastic deformations of the dimensionally stable metal netting, which are imparted thereto in an appropriate structure and arrangement and in particular bring about a sound absorption. Thus, the damping principle according to the invention is characterized by a complete departure from conventional damping actions, where the damping is brought about by a wide-mesh knitted fabric tube, which has a height significantly exceeding the thickness of the wire filament forming it and whose meshes, which must be protected for maintaining the damping function against penetrating dirt, such as loose stones, can be moved in the tension and compression directions. According to a preferred development, the metal netting of the invention can comprise one or more wire coils and completely surround the bellows, so that the latter is protected against dirt. The inherently stable metal braiding provided with plastic deformations maintains its characteristics even under dirt exposure and also contributes to the axial support of the ends of the line element relative to one another, because it engages directly on the bellows and consequently acts as a stop member, particularly in the tension direction, which is important with suddenly occurring inertia forces. Thus, an excessive elongation of the bellows is reliably prevented.

The metal netting can be in monofilament or multifilament form and for a multifilament construction it preferably has metal bands or strips of differing thickness and consequently differing fundamental frequencies, so that the resonance case occurs when there is no vibrational excitation of the netting. The metal netting can e.g. be built up from a basic netting of stronger or thicker metal filaments, in which are introduced less strong or thinner metal filaments, e.g. by weaving therein.

The plastic deformations imparted to the metal netting are provided as shaped profiles facing and/or remote from the bellows and in the simplest case are in the form of circular depressions or elevations. However, as a function of the damping requirement, the plastic deformations can also have any other random profiling, e.g. oval or polygonal and can be distributed either over the entire circumference of the wire netting or in planned manner at particularly vibration-sensitive areas. According to a preferred variant, elongated depressions or elevations extend longitudinally or helically or crosswise around the bellows surface.

Whereas in one application of the line element of the invention, namely for exhaust pipes of internal combustion engines for motor vehicles, the metal netting is preferably applied to the outside of the bellows and consequently has a protective function in addition to the damping function, particularly when high damping requirements exist and additional netting can be applied to the inside of the bellows. If there is no need for a protection against external effects, the netting can also be exclusively applied to the inside of the bellows.

In order to create a reliable fixing of the metal netting and the bellows to the connection ends of the line element and consequently an effective longitudinal support, preferably the metal netting is held on the ends of the bellows by cylindrical rings. The rings which are preferably externally mounted on the bellows with the metal netting ensure that the netting reliably directly engages on the bellows, so that a release of the metal netting and consequently a loss of its damping characteristics is prevented.

According to a further development an inliner is provided. It is a medium-conducting, optionally of sound-absorbing element, such as a woven fabric tube or the like.

BRIEF DESCRIPTION OF THE DRAWINGS

Embodiments of the line element according to the invention are described hereinafter with reference to the attached drawings, wherein show.

DETAILED DESCRIPTION OF THE PREFERRED EMBODIMENTS

Figure 1:
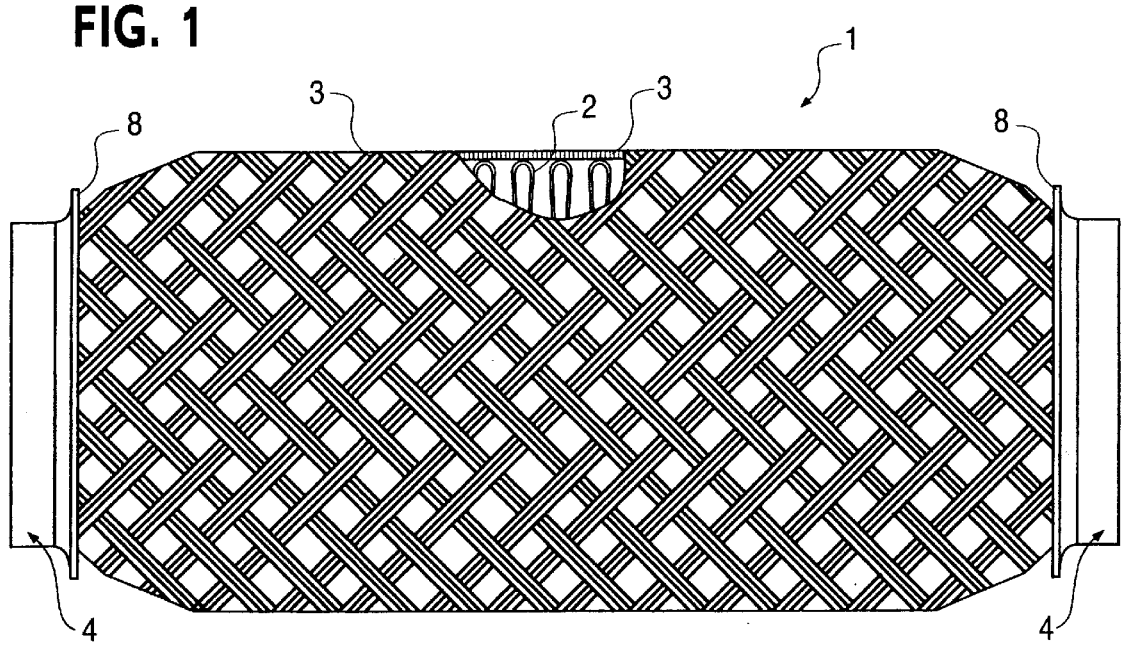
FIG. 1 a side view of a line element with a sectionally represented metal netting.

The flexible line element 1 shown in FIG. 1 has an annularly corrugated bellows 2, to whose outside is applied a sectionally represented metal netting 3 directly surrounding the same. The line element 1 has at its cylindrical connection ends a cylindrical rings 8 for fixing the line element 1 in an exhaust pipe and for the reliable fixing of the metal netting 3 to the bellows 2.

Figure 2:
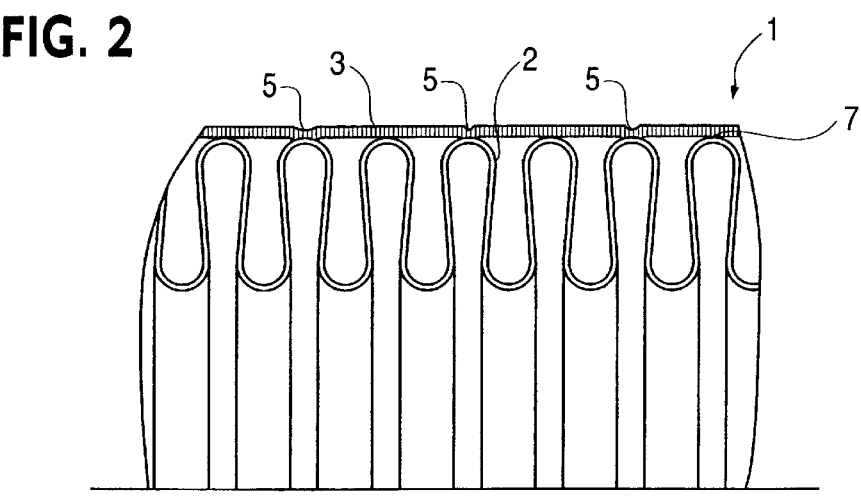
FIGS. 2 & 3 illustrate different arrangements of plastic deformations in a metal netting with respect to an annularly corrugated bellows.
Figure 3:
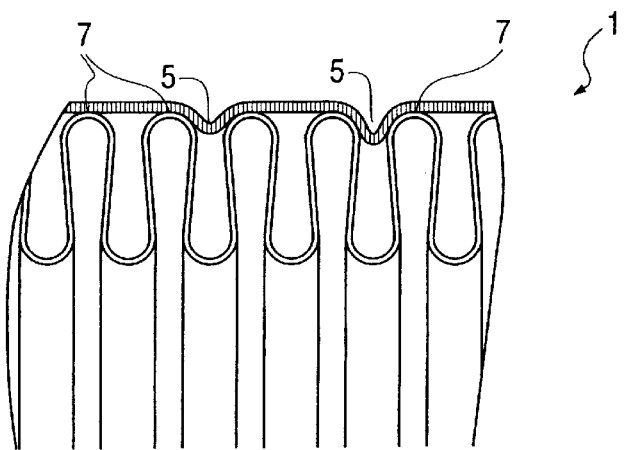
Figure 4:
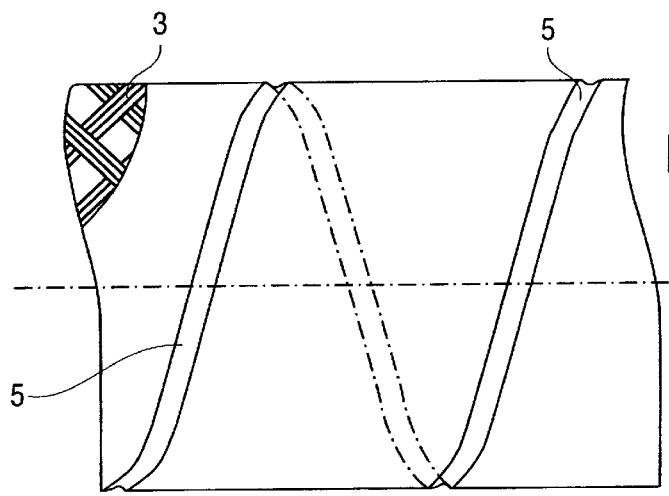
FIGS. 4–9 illustrate the most varied plastic deformations of a sectionally represented metal netting.

FIGS. 2 and 3 show the metal netting 3 of a line element 1 with plastic deformations 5, facing an annularly corrugated bellows 2, imparted on the metal netting 3. The deformations 5 can be located both at the contact points 7 of the bellows 2 with the metal netting 3 (FIG. 2) and also between the contact points 7 (FIG. 3). To bring about an optimum damping of the bellows 2, according to a preferred development the plastic deformations 5 of a metal netting 3 are located both at and also between the contact points 7 of a bellows 2.

Figure 7:
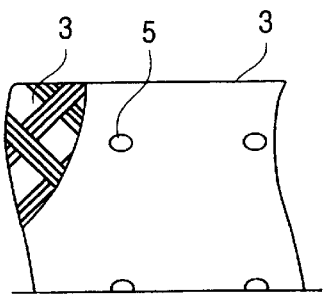
Figure 5:
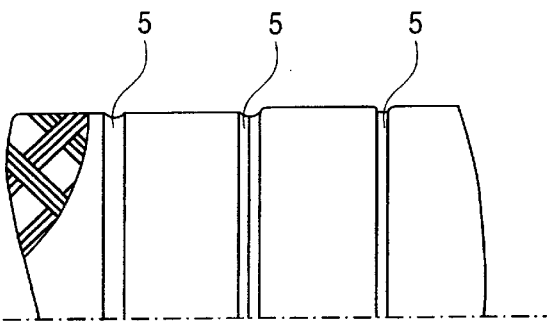
Figure 8:
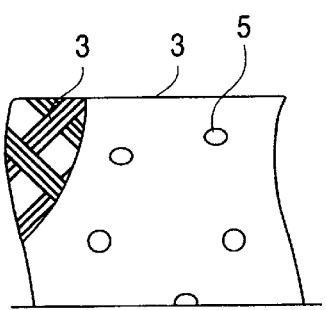
Figure 6:
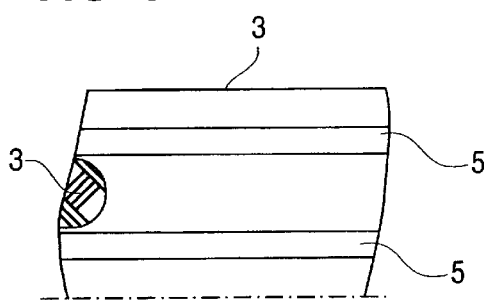
Figure 9:
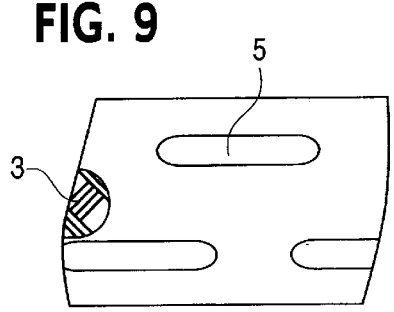

FIGS. 4 to 9 show very varied plastic deformations 5 of a sectionally represented metal netting 3. The deformation 5 in the form of a depression shown in FIG. 4 extends in screw thread-like manner around the circumferential surface of the cylindrical line element. FIGS. 5 and 6 show radial (FIG. 5) or longitudinal directed (FIG. 6) deformations 5, which have different profiles in FIG. 5. Whereas FIGS. 7 and 8 show symmetrical (FIG. 7) or asymmetrical (FIG. 8) punctiform deformations, FIG. 9 shows elongated hole-like deformations 5 in the longitudinal direction of the line element. Obviously not only the embodiments of the plastic deformations shown in FIGS. 4 to 9 can be varied in random number and combination, but the deformations 5 imparted to a metal netting 3 of a line element 1 can be of random form and the represented embodiments are merely to be looked upon as a selection of possible variants.

Figure 10:
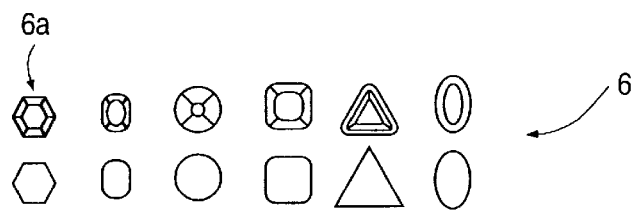
FIG. 10 illustrate the most varied shape profiles of plastic deformations on a metal netting.

Finally, FIG. 10 shows different shaped profiles 6 of the plastic deformations in a metal netting, which can be round, oval or polygonal and, as shown in the upper row 6a, can have different heights or depths.

In the manufacture of a line element according to the invention, either the metal netting can be prefabricated, the plastic deformations imparted and the metal netting subsequently placed on the inside or outside of a corresponding bellows, or the metal netting and bellows are prefitted and subsequently the plastic deformations are imparted to the metal netting.

What is claimed is:

1. A flexible line element for use in an exhaust pipe in an internal combustion engine comprising:

a bellows;

a metal sleeve coaxial to and contacting the bellows at an outer surface thereof;

at least one deformation in the metal sleeve which projects radially inwardly into circumferential and longitudinal spaced engagement with the metal bellows to damp at least one of sound and mechanical vibrations of the bellows.

2. An element in accordance with claim 1 further comprising:

a cylindrical ring disposed at opposed ends of the bellows and sleeve which fixes the sleeve to the bellows and provides a connection to an exhaust pipe.

3. An element in accordance with claim 2 wherein:

the sleeve is a netting.

4. An element in accordance with claim 1 wherein:

the sleeve is a netting.

5. An element in accordance with claim 4 wherein:

the netting is a monofilament.

6. An element in accordance with claim 4 wherein:

the netting has multiple filaments.

7. An element in accordance with claim 6 wherein:

the multiple filaments are of different thicknesses.

8. An element in accordance with claim 4 further comprising:

a cylindrical ring disposed at opposed ends of the bellows and netting which fixes the netting to the bellows and provides connection to the exhaust pipe.

9. An element in accordance with claim 4 further comprising:

a cylindrical ring disposed at opposed ends of the bellows and netting which fixes the netting to the bellows and provides connection to the exhaust pipe.

10. An element in accordance with claim 4 wherein:

the at least one deformation tapers away from the outer surface of the netting.

11. An element in accordance with claim 4 wherein:

the at least one deformation has a circular base.

12. An element in accordance with claim 4 wherein:

the at least one deformation has a polygonal base.

13. An element in accordance with claim 4 wherein:

the at least one deformation has an elongated base.

14. An element in accordance with claim 13 wherein:

the elongated base extends radially inward toward the bellows.

15. An element in accordance with claim 13 wherein;

the elongated base extends longitudinally along the netting.

16. An element in accordance with claim 13 wherein:

the elongated base extends in a helical manner around a circumference of the netting.

17. An element in accordance with claim 4 wherein:

a plurality of deformations are arranged symmetrically relative to the bellows.

18. An element in accordance with claim 4 wherein:

a plurality of deformations are arranged asymmetrically relative to the bellows.

19. An element in accordance with claim 4 further comprising:

an inliner.

20. A method of manufacturing in accordance with claim 4 wherein:

the at least one deformation is imparted into the netting and subsequently the netting is drawn over the bellows.

21. A method in accordance with claim 4 wherein:

the netting is drawn over the bellows and subsequently the at least one deformation is imparted into the netting.

22. An element in accordance with claim 1 wherein:
the bellows is annularly corrugated.
23. An element in accordance with claim 1 wherein:
the bellows is helical.
24. An element in accordance with claim 1 wherein:
the at least one deformation tapers away from the outer surface of the netting.
25. A flexible line element for use in an exhaust pipe in an internal combustion engine comprising:
- a bellows having a plurality of longitudinally spaced apart outer ridges;
- a metal sleeve coaxial to and contacting the bellows at an outer surface thereof; and
- at least one deformation in the metal sleeve which projects radially inwardly into circumferential and longitudinal spaced engagement with the metal bellows between the spaced apart outer ridges to damp at least one of sound and mechanical vibration of the bellows.

26. An element in accordance with claim 25 further comprising:
- a cylindrical ring disposed at opposed ends of the bellows and sleeve which fixes the sleeve to the bellows and provides a connection to an exhaust pipe.

27. An element in accordance with claim 26 wherein:
the sleeve is a netting.

28. An element in accordance with claim 27 wherein:
the bellows is annularly corrugated.
29. An element in accordance with claim 27 wherein:
the bellows is helical.
30. An element in accordance with claim 27 wherein:
the netting is a monofilament.
31. An element in accordance with claim 27 wherein:
the netting has multiple filaments.
32. An element in accordance with claim 27 further comprising:
- a cylindrical ring disposed at opposed ends of the bellows and netting which fixes the netting to the bellows and provides connection to the element pipe.

33. An element in accordance with claim 27 wherein:
the at least one deformation extends in a helical manner around a circumference of the netting.

34. A method of manufacturing in accordance with claim 27 wherein:
the at least one deformation is imparted into the netting and subsequently the netting is drawn over the bellows.

35. A method in accordance with claim 27 wherein:
the netting is drawn over the bellows and subsequently the at least one deformation is imparted into the netting.

* * * * *